Patented July 11, 1939

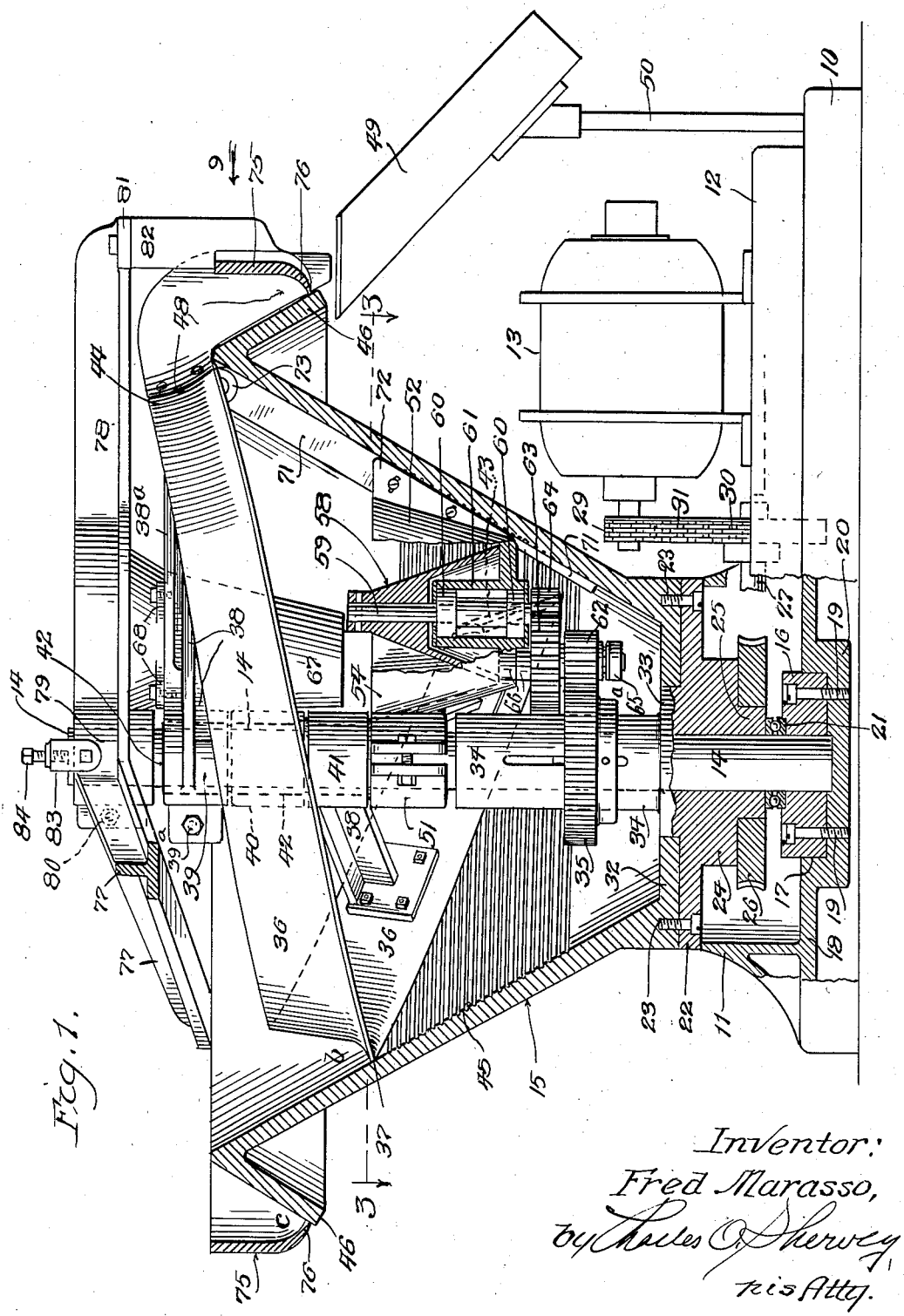

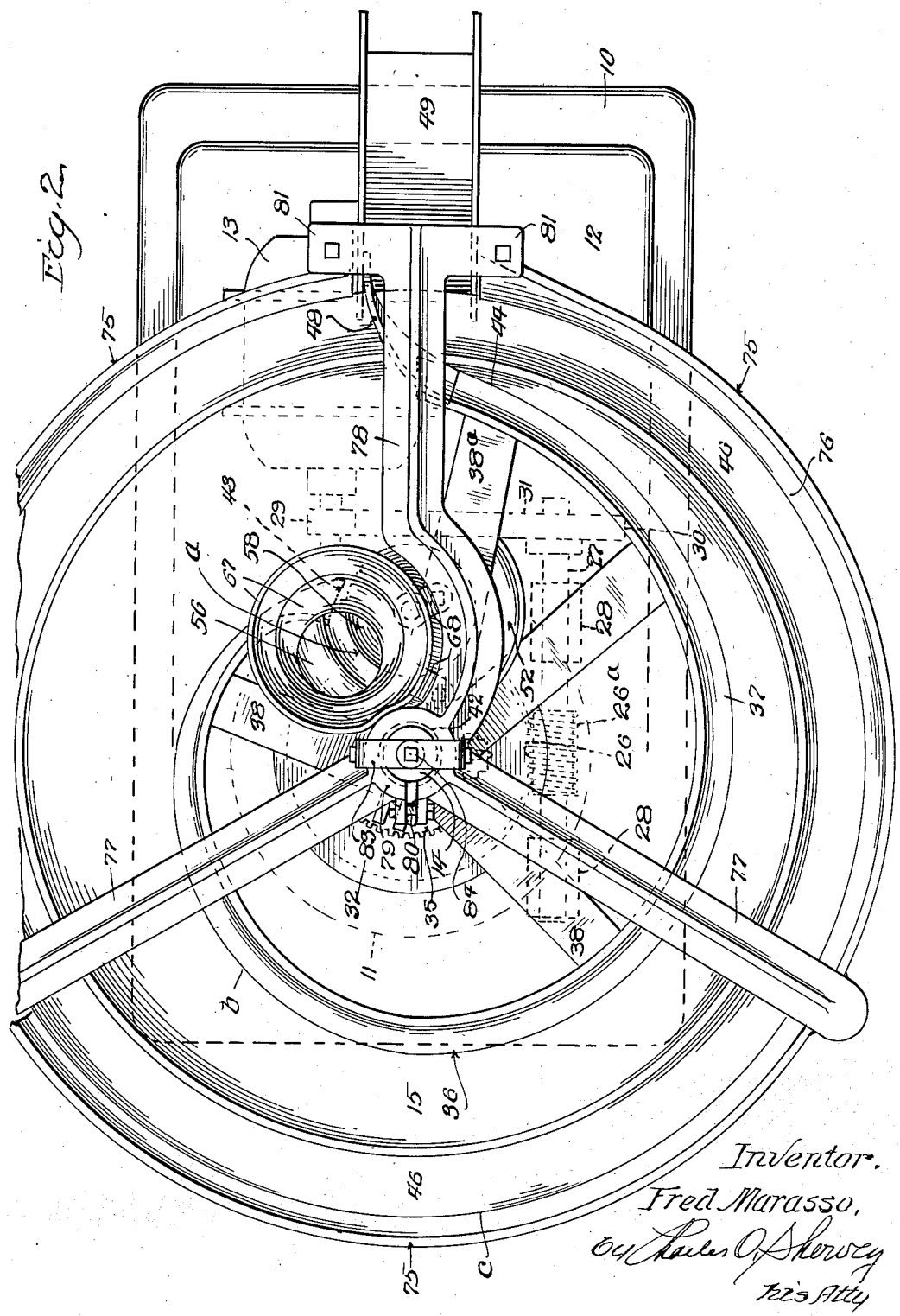

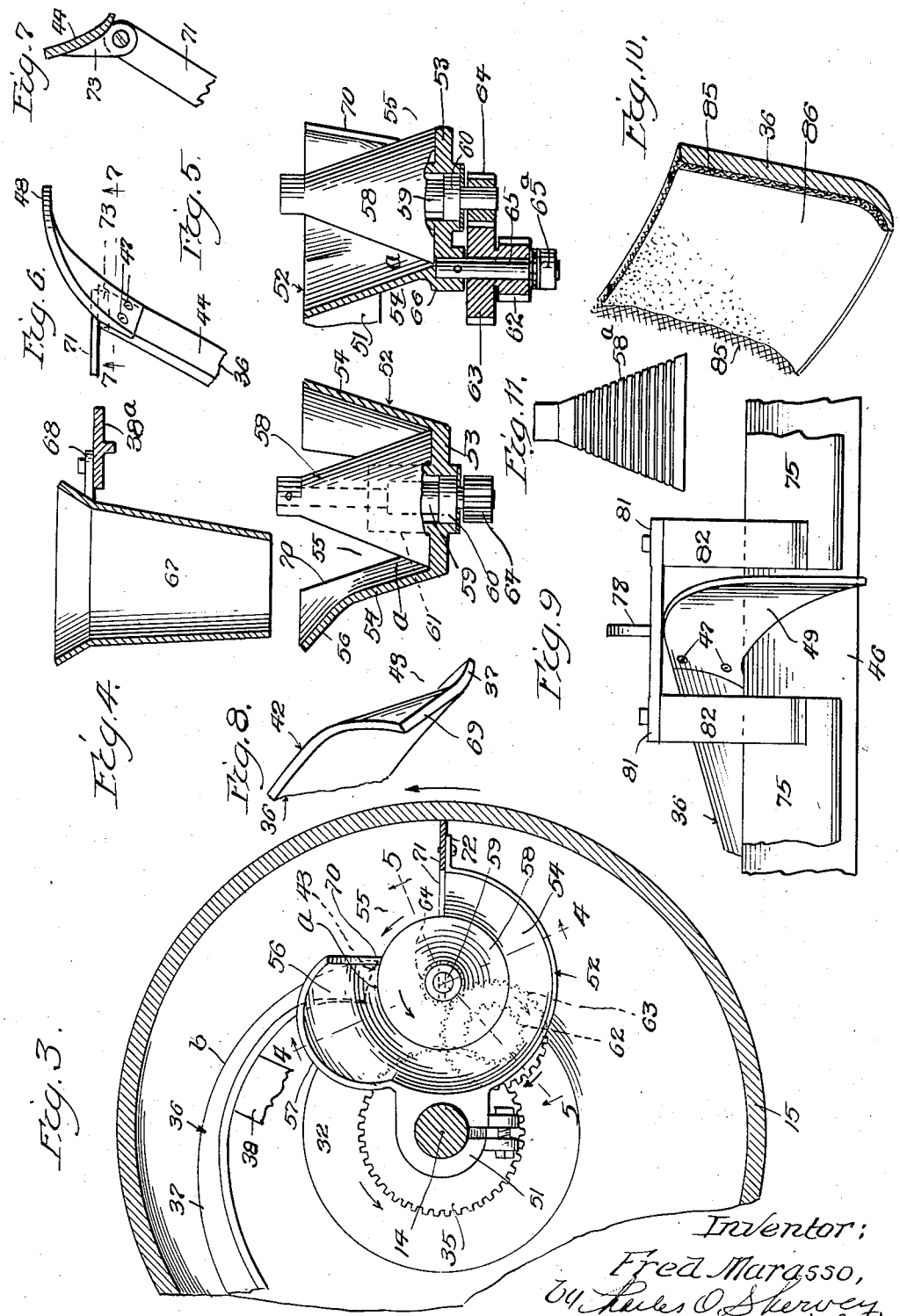

2,165,495

UNITED STATES PATENT OFFICE 2,165,495

ROUNDER

Fred Marasso, Joliet, Ill., assignor to Union Machinery Company, Joliet, Ill., a corporation of Illinois Application April 16, 1938, Serial No. 202,528

22 Claims. (Cl. 107—9)

This invention relates to rounders and this application is a continuation in part of my co-pending application, Serial No. 150,566, filed June 26, 1937, and which matured May 31, 1938, into Patent No. 2,119,018.

Among the objects of the present invention is to increase the capacity of rounders without materially increasing their size. Another object is the provision of preliminary or initial rounding-up means for instantly commencing the rounding-up operation as soon as a lump of dough is delivered to the rounder. Another object is the provision of means for smoothening the spiral member of the rounding-up means so as to facilitate rolling the dough lumps through the rounding-up means and to avoid any possibility of the dough lumps sticking to the rounding-up means, and still another object is to provide supplemental rounding-up means in addition to the main rounding-up means.

At the present time, speed is an important factor in the bakery industry and sometimes as many as two hundred lumps of dough per minute must be handled. It has been found from actual experience that speeding up the rotatable member of the rounding-up means is not satisfactory and one of the objects of this invention is to provide preliminary or initial rounding-up means to which the dough lumps are delivered, which preliminary or initial rounding-up means is arranged to function so as to start the rounding-up operation more quickly than the usual rounding-up means employed in rounders.

As is well known, rounding-up means for rounders usually comprise a rotatable rounding-up member, sometimes in the form of an inverted conical bowl associated with a stationary, spiral, coacting, rounding-up member contacting the internal face of the bowl, and sometimes the rounding-up means are in the form of an inverted conical or a cylindrical rotating member associated with a stationary, coacting, rounding-up member surrounding and contacting with the external face of the rotatable member. The present invention is applicable to the several types of rounders above mentioned.

With these and other objects and advantages in view, this invention consists in a rounder having preliminary rounding-up means operating in advance of the main rounding-up elements. It further consists in a rounder as above specified in which the rotating member of the preliminary rounding-up means is driven at a higher peripheral speed than that of the rotating member of the main rounding-up means. It further consists in a rounder having a spiral rounding-up member provided with a foundation on its rounding-up face coated with paraffin, wax or a like substance. It further consists in a rounder having supplemental rounding-up means capable of operating in conjunction with the main rounding-up means and also capable of being rendered inoperative.

The invention further consists in the several novel features of construction, arrangement and a combination of parts hereinafter more fully set forth and particularly pointed out in the appended claims.

One embodiment of the invention is illustrated in the drawings accompanying this specification in which:

Fig. 1 is a view partly in side elevation and partly in central, vertical, longitudinal section of the rounder.

Fig. 2 is a plan, partly broken away, of the rounder seen in Fig. 1.

Fig. 3 is a fragmental view partly in plan and partly in horizontal section taken on the line 3—3 of Fig. 1.

Fig. 4 is a detail, vertical cross-section taken on the line 4—4 of Fig. 3.

Fig. 5 is a detail, vertical section taken on the line 5—5 of Fig. 3.

Fig. 6 is a fragmental plan of the spiral rounding-up member and a deflector.

Fig. 7 is a detail, vertical cross-section taken on the line 7—7 of Fig. 6.

Fig. 8 is a fragmental, perspective view of the inlet end of the spiral rounding-up member.

Fig. 9 is a fragmental end elevation of the supplemental rounding-up means, the view being taken in the direction of the arrow 9 in Fig. 1.

Fig. 10 is a fragmental, perspective view of a fragment of the spiral rounding-up member.

Fig. 11 is a side elevation of the cone member of the preliminary rounding means illustrating an additional feature.

Referring to said drawings, which are more or less schematic and are not intended as working drawings, the reference character 10 designates a rectangular base having a raised circular hollow part 11 at one end and a raised rectangular platform 12 extending therefrom to the other end of the base. An electric motor 13 mounted on the platform furnishes the power for driving the rotating elements of the rounder.

Rising coaxially with the circular part 11 of the base and rigidly secured to the base is an upright stationary shaft 14, around which is rotatively mounted the main rotatory rounding-up member, here shown as comprising a bowl 15 of inverted frusto-conical form. As shown, a block 16 (see Fig. 1) is shrunk upon the lower end of the shaft 14 and is let into a recess 17 formed in a horizontal wall or web 18 of the base and secured thereto by screws 19 threaded in the wall 20 which forms the bottom of the recess 17.

Rotatively mounted upon the shaft 14 and carried by a thrust bearing 21 resting on the block 16 is a hub member 22 to which the rounding-up bowl 15 is secured by screws 23, and said hub member is provided with a shouldered part 24 having a reduced neck 25 on which is rigidly mounted a worm gear 26 with which meshes a worm pinion 26ª (see Fig. 2) mounted on a shaft 27 journaled in bearings 28 rising from the base part 18. Desirably the shaft 27 is driven from the electric motor 13 by chain gearing here shown as comprising sprocket wheels 29, 30, mounted respectively on the motor shaft and the shaft 27 and a link belt 31 trained around said sprocket wheels. This drive mechanism is intended merely as illustrative of one type of drive mechanism between the electric motor and rounding-up bowl, as various other equivalent driving means may be substituted therefor as is well understood.

The rounding-up bowl 15 is provided at its lower end with a flat bottom wall 32 which rests on the upper face of the hub member 22 and is provided with an aperture through which projects a boss 33 (see Fig. 1) formed on the upper end of the hub member. A sleeve 34, formed as a part of or otherwise secured to the hub member 22 projects up from the boss 33 and upon said sleeve is keyed or otherwise rigidly secured a gear wheel 35 that forms part of a train of gears which rotates the rotating element of the primary rounding-up means as will be presently described.

The stationary spiral rounding-up member which cooperates with the rounding-up bowl 15 to round up lumps of dough is illustrated at 36. Desirably, the spiral rounding-up member is generally straight in cross-section with an outwardly curved lip 37 at its lower edge which contacts with the inner face of the rounding-up bowl, the straight portion extending upward at a slight inclination with respect to the vertical so as to provide a generally V or U shaped trough b, in which the dough lumps are rounded up as is well understood by those skilled in the art to which this invention pertains. Near its discharge end the spiral rounding-up member is tilted back more and may be more or less rounded in cross-section.

The spiral rounding-up member is carried by arms 38, 38ª, bolted or otherwise secured to the inner face of the spiral rounding-up member and extending from hubs 39, 40, 41, rigidly secured upon a split sleeve 42 surrounding the shaft. The hub 39 is split and provided with ears connected by clamp bolts 39ª whereby the hubs and sleeve are rigidly secured upon the upright shaft 14.

The inlet end 43 of the spiral rounding-up member 36 is located adjacent the lower end of the bowl and the discharge end 44 of the spiral is located at the upper edge of the bowl, the extent of the spiral being 360° or less, whereby the dough lumps are required to travel through an arc of approximately 360° or less during the main rounding-up operation. With the use of a spiral round-up member of less than 360°, there is no possibility of slivers of dough that may be squeezed down between the face of the bowl and spiral rounding-up member from falling into any part of the spiral rounding-up member as is the case where said member has a greater extent than 360°.

Desirably, the inner face of the rounding-up bowl 15 is formed with circumferentially extending grooves 45 (see Fig. 1) which, however, terminate approximately at a level midway between the inlet end and discharge end of the spiral rounding-up member. The grooves may be in the form of a helix and are machined in the internal face of the bowl. The function of the grooves in the internal face of the rounding-up bowl is to obtain a better purchase upon the dough lumps as they are rolled up the spiral trough b, thereby causing the surface portion of the dough lumps to be drawn towards the bottom of the trough, causing them to roll about and present all portions of their surfaces to the rounding-up members. Heretofore, it was thought necessary to extend the grooves to the upper edge of the bowl but in actual practice I have found that this is unnecessary and that the grooves may terminate at about the place above mentioned, thereby leaving the upper internal face of the bowl smooth and also leaving the lower portion of the internal face smooth as illustrated in Fig. 1. As the grooves are machined in the face of the bowl, this entails considerable expense and, by omitting the greater portion of the grooves, a large saving is had in the cost of labor.

From the upper edge of the bowl 15 projects a downwardly inclined annular flange 46 desirably in the form of a truncated cone, which forms one member of the supplemental rounding-up means as will be presently described.

Removably secured as by screws or bolts 47 to the upper end 44 of the spiral rounding-up member 36 (see Fig. 6) is a deflector 48 which forms a continuation of the spiral rounding-up member and said deflector extends over the upper edge of the bowl 15 and down along the flange 46 with its lower edge in close proximity thereto. The deflector is twisted so that its outer end portion is substantially vertical and extends in an approximately radial direction from the bowl and serves to deflect the rounded-up dough balls from the spiral groove b and discharge them in a generally radial direction therefrom. A downwardly inclined chute 49 supported by a post 50 that rises from base 18, is held with its upper end underneath the rim of the flange 46 so as to receive the rounded-up dough lumps therefrom and deliver them to other apparatus for subsequent manipulation.

The preliminary rounding-up means will now be described:

Rigidly mounted upon the stationary upright shaft 14, as by a clamp lug 51 located above the sleeve 34 is a stationary preliminary rounding-up element here shown in the form of a bowl 52 (see Figs. 3, 4 and 5) desirably of inverted frusto conical form having a bottom wall 53 from which rises a conical side wall 54 which has a section removed therefrom to leave a discharge opening 55 between the interior of the preliminary rounding-up bowl 52 and the interior of the main rounding-up bowl 15 whereby partially rounded-up dough lumps may be discharged from the preliminary rounding-up means to the main rounding-up bowl. Adjacent the opening 55 the conical wall 54 of the preliminary rounding-up bowl is tilted backwards as at 56 (see Figs. 3 and 4) and its upper edge is shaped to take a semi-circular form as seen at 57, the purpose of which will be presently explained.

Rotatively mounted in the preliminary bowl 52 and extending up from the circular edge of its bottom wall is a coacting rounding-up roll 58, desirably in the form of a cone, which cooperates with the internal conical face of the preliminary bowl to initiate the rounding-up operation on the dough lumps. The roll 58 is pinned or otherwise fastened upon an upright spindle or shaft 59 which is journaled in anti-friction bearing 60 contained in an upstanding cylindrical boss 61 desirably formed integral with the bottom wall 53 of the preliminary bowl. The conical face of the roll may be fluted as seen at 58ª in Fig. 11 to obtain a better purchase on the dough lumps.

Rotation is imparted to the roll 58 from the sleeve 34 by a train of speed increasing gears, here shown as comprising the gear wheel 35, heretofore referred to, a pinion 62 in mesh therewith, a gear wheel 63 rigid with the pinion 62 and a pinion 64 meshing with the gear wheel 63 and fast upon the lower end of the spindle or shaft 59 (see Fig. 5). The pinion 62 and gear wheel 63 are rotatively mounted on a stationary upright spindle 65 (see Fig. 5) rigidly secured in a boss 66 cast adjacent the bottom of the preliminary bowl. A thrust bearing 65ª on the lower end of the spindle 65 supports the pinion 62 and gear wheel 63.

The direction of rotation of the train of gears and the rounding-up roll 58, is indicated by the adjacent arrows in Fig. 3. However, the position of the inlet and discharge opening of the preliminary bowl may be reversed and the rounding-up roll 58 may be rotated in the reverse direction if so desired.

Above and approximately concentric with the semicircular part 57 of the preliminary bowl is a hopper 67 which has ears 68 projecting from its side that rest on and are bolted to the arm 38ª. Desirably, the upper end of the hopper flares outwardly and its lower end is disposed above the trough $a$, formed between the side wall of the preliminary bowl and the roll 58 whereby dough lumps, dropped into the hopper, will fall into said trough $a$ and will be instantly started around said trough by the roll 58. Dough lumps are delivered to the rounder in rapid succession from a divider by a suitable conveyor (not shown) and are dropped through the hopper into the trough. The action of the preliminary rounding-up means seals the raw faces of the dough lumps coming from the divider and this is accomplished with the preliminary bowl and roll in rolling the dough lumps around through the trough $a$. By the time a dough lump is discharged from the preliminary rounding-up means, skin has been formed on its surface and it is ready for the main rounding-up operation.

The inlet end 43 of the spiral rounding-up member 36 is located at the side of and partly below the preliminary bowl (see Fig. 3), its extreme end being bent back and away from the face of the bowl 15 as at 69 (see Fig. 8) to facilitate the passage of the dough balls into the spiral trough $b$ (see Fig. 3) between the main rounding-up bowl and the spiral rounding-up member. The starting point of the spiral rounding-up member is located directly below the lower end of the edge 70 of the discharge opening 55 (see Fig. 3), whereby the dough balls discharging from the preliminary rounding-up means, under the influence of centrifugal force, imparted to them by the rotating roll 58, roll into the flaring inlet end of the spiral rounding-up member and the internal face of the main rounding-up bowl immediately takes hold of the partially rounded-up dough balls and rolls them up the spiral trough $b$, completing the rounding-up operation and finally discharges the finished dough balls from the rounder.

Although the spiral rounding-up member 36 contacts with the internal face of the bowl 15, nevertheless sometimes small slivers of dough are squeezed down between the bowl and the spiral member. They may adhere to the face of the bowl or they may roll down the same, and, because the spiral rounding-up member does not extend throughout an arc of more than 360°, none of the slivers of dough can fall into any part of the spiral trough below but those that roll down gather on the bottom wall 32 of the bowl from which they may be removed when the rounder is being cleaned. Since no slivers can enter the spiral trough none can be picked up by dough lumps that are being rounded up, and, consequently, the dough balls are not marred or made unsightly by pieces of dough (which may have become discolored) which would otherwise be picked up by the dough balls. For removing any dough slivers that may adhere to the internal face of the bowl 15, a scraper 71 desirably in the form of a flat blade, is provided which contacts with the internal face of the bowl. Conveniently the scraper may be bolted or otherwise secured to a flange 72 formed on the conical wall of the preliminary bowl 52 and desirably, the upper end of the scraper is bolted or otherwise fastened to a lug 73 which projects down from the extreme upper end 44 of the spiral rounding-up member 36 (see Fig. 7) to aid in holding the scraper rigid. Any dough slivers adhering to the internal face of the bowl are scraped off the same by the scraper, thus keeping the surface free from dough.

Ordinarily, dough lumps are fully rounded up when run through the rounding-up means of the rounder, but sometimes certain doughs are used in the manufacture of bread which require more rolling than is done in the spiral trough. To provide for this, a supplemental, dough rolling, incomplete ring 75 is provided which surrounds the rough rolling flange 46 and has a lip 76 contacting therewith and thus forming an annular U or V shaped trough $c$. A gap is left between the ends of the ring at the discharge end of the machine to permit of the discharge of the rounded-up dough balls. The ring is supported by arms 77, 78 that radiate from a hub 79 mounted on the upright shaft 14 and are suitably fastened to the ring 75. The hub 79 is split and is provided with ears and a clamp bolt 80 (see Figs. 1 and 2) whereby the hub may be rigidly clamped upon the upright shaft 14. The arm 78 is formed with a curved portion to pass around the upper end of the hopper 67, and at its outer end said arm has two oppositely directed lugs 81 that span the gap between the ends of the ring 75 and are bolted to upstanding posts 82 which are secured to and extend up from the end portions of the ring. A yoke 83 secured to the hub 79 and a screw 84 threaded in the yoke provide means for raising and lowering the ring 75 with respect to the flange 46.

When the supplemental rounding-up means are employed, the deflector 48 is removed from the spiral rounding-up member 36. The dough balls then discharging from the spiral trough b roll along the flange 46, owing to centrifugal action imparted to them by the rotating rounding-up bowl, and roll past the gap in the ring 75 and lodge in the trough c between the flange 46 and the ring 75. The rotating flange 46 then rolls the dough balls around through the trough c, finally discharging them through the gap in the ring 75, whereupon the finished dough balls roll off the flange 46 and down the chute 49.

In order to permit the dough lumps to be rolled smoothly along the spiral rounding-up member 36, paraffin, wax or other similar material is applied to the working face of said spiral rounding-up member. With the use of a paraffin or similar liner, a very smooth surface is provided and there is no likelihood for the dough lumps to adhere to said spiral rounding-up member. Therefore, the rotating bowl is capable of acting more effectively in rolling the dough lumps up the spiral rounding-up member. In Fig. 10 I have shown a strip of wire mesh 85 which is tightly stretched and secured to the working face of the spiral rounding-up member 36, as by soldering it to the upper and lower edge portions thereof. The paraffin, wax or other like substance 86 is applied to the wire mesh 85 and the surface thereof is smoothed. Instead of wire mesh, a canvas strip may be used suitably fastened to the spiral rounding-up member, or its face may be otherwise treated to enable the paraffin, wax or other similar material to cling to the face of the spiral rounding-up member when applied thereto.

I claim as new and desire to secure by Letters Patent:

1. In a rounder, coacting, stationary and rotatory rounding-up elements upon which dough lumps are delivered and partially rounded up, in combination with main stationary and rotatory rounding-up elements having a receiving end located below the first mentioned rounding-up elements, upon which the first mentioned rounding-up elements deliver partially rounded-up dough lumps, and drive mechanism between the rotary rounding-up elements.

2. In a rounder, a stationary rounding-up bowl in which dough lumps are partially rounded up, said bowl having a side wall of inverted frusto-conical form containing a discharge opening, a conical rotatory roll in said bowl and forming with its wall a trough, said roll cooperating with the wall of the bowl to partially round up dough lumps, and a hopper through which dough lumps are dropped into said trough, in combination with a rotatory main rounding-up bowl having a side wall of inverted frusto-conical form surrounding said first mentioned bowl, and a stationary, spiral rounding-up member having a lip contacting with the main rounding-up bowl, said spiral rounding-up member having a receiving end disposed below the first mentioned bowl and located in position to receive partially rounded-up dough lumps discharged from the first mentioned bowl.

3. In a rounder, a preliminary rounding-up means upon which dough lumps are delivered and partially rounded and from which they are discharged, in combination with a rotatory main rounding-up member and a stationary, spiral rounding-up member having a lip contacting with the rotatory rounding-up member, the receiving end of the spiral rounding-up member being disposed below the preliminary rounding-up means, and the spiral rounding-up member being of less than 360° in extent, and drive mechanism between the main rotary rounding-up member and a rotating element of the preliminary rounding-up means.

4. In a rounder, a stationary rounding-up bowl in which dough lumps are partially rounded up, said bowl having a side wall of inverted frusto-conical form containing a discharge opening, a conical rotatory roll in said bowl and forming with the wall thereof a trough, said roll cooperating with the wall of the bowl to partially round up dough lumps, in combination with a rotatory main rounding-up bowl having a side wall of inverted frusto-conical form surrounding said first mentioned bowl, a stationary, spiral rounding-up member having a lip contacting with the wall of the main rounding-up bowl, said spiral rounding-up member having an inlet and disposed below the first mentioned bowl and located in position to receive partially rounded-up dough lumps discharged from the first mentioned bowl, an upright member rigidly connected to the main rounding-up bowl and speed-increasing gearing between said member and the conical roll of the preliminary rounding-up means.

5. In a rounder, preliminary rounding-up means into which dough lumps are delivered and partially rounded and from which they are discharged, said means having a rotating element, a rotatory main rounding-up bowl surrounding said preliminary rounding-up means, an upright, stationary shaft, an upright sleeve surrounding said shaft and rigidly connected with the main rounding-up bowl, and speed increasing gearing between said upright member and the rotating element of the preliminary rounding-up means.

6. In a rounder, the combination of a rotatory rounding-up bowl of inverted frusto-conical form, provided with a downwardly projecting conical flange at its upper edge, a stationary upright shaft around which the bowl revolves, a stationary spiral rounding-up member having a lip contacting with the inner face of said bowl and extending to the upper edge thereof, a deflector removably secured to the upper end of the spiral rounding-up member and having an edge extending down along the conical flange and said deflector being curved to extend transversely of the flange, an incomplete ring surrounding said flange and having a lip contacting therewith and forming therewith supplemental rounding-up means, and arms secured to said shaft and to said ring and forming the support therefor.

7. The combination of a rotatory rounding-up element having internal and external rounding-up faces, a stationary, spiral rounding-up member contacting with the internal rounding-up face of the rotatory rounding-up element and cooperating therewith to round up dough lumps, and a stationary incomplete ring extending part way around the external rounding-up faces of the rotating rounding-up element and contacting with the same.

8. In a rounder, a stationarily mounted preliminary rounding-up bowl, having a side wall of inverted frusto-conical form, there being a dough lump receiving space in the bowl and a discharge opening in its side wall, a conical roll rotatively mounted in said bowl and cooperating therewith to roll the dough lumps from the receiving space to the discharge opening to thereby partially round up dough lumps in the trough between the bowl and roll, and means to rotate the roll, in combination with main rounding-up means, upon which the partially rounded-up dough lumps are discharged from said discharge opening in the preliminary rounding-up bowl.

9. In a rounder, a preliminary rounding-up bowl having a circular bottom and a side wall extending up therefrom, a hollow boss extending up from the bowl bottom, a spindle rotatively mounted in said boss and extending upwards and downwards therefrom, a conical roll extending up from the margin of the bowl bottom and surrounding said hollow boss, the upper end of the roll being fast on the upper end of the spindle, and a pinion fast on the lower end of the spindle.

10. The combination of a rotatory rounding-up element having internal and external rounding-up faces, a stationary, spiral rounding-up element contacting with the internal rounding-up face of the rotatory rounding element and cooperating therewith to round up dough lumps, and a stationary, arcuate rounding element extending beyond the discharge end of the spiral rounding-up element, part way around the external rounding-up face of the rotatory rounding-up element and contacting with the same.

11. The combination of a rotatory rounding-up bowl having a downwardly projecting annular flange at its upper edge, a stationary, spiral rounding-up element contacting with the internal face of said bowl and cooperating therewith to round up lumps of dough, and a stationary, incomplete rounding-up ring surrounding said flange and having a lip contacting therewith, said flange and incomplete ring cooperating to additionally round up dough balls.

12. In a rounder, a rotatory flaring rounding-up bowl, stationary supporting means therein, and an upwardly inclined straight scraper contacting with the internal face of the bowl and supported by said stationary supporting means.

13. In a rounder, preliminary rounding-up means comprising a stationary rounding-up bowl in which dough lumps are partially rounded up, said bowl having a receiving place for receiving dough lumps and a discharge opening in its wall at another place and a rotatory roll cooperating with said bowl to partially round up dough lumps therein and discharge the partially rounded up dough lumps through the opening in a tangential direction, in combination with a rotatory main rounding-up bowl in which the preliminary rounding-up means are contained and a stationary spiral rounding-up member having a lip in contact with the internal face of the main rounding-up bowl, said spiral rounding-up member having a receiving end located below and in close proximity to the first mentioned bowl in position to receive the tangentially discharged, partially rounded-up dough lumps from the opening in the first mentioned bowl.

14. In a rounder, preliminary coacting stationary and rotatory coacting rounding-up elements, upon which dough lumps are delivered and partially rounded up, and from which the partially rounded-up dough lumps are discharged in a tangential direction, main stationary and rotatory coacting rounding-up elements, of which the stationary element has a receiving end upon which the preliminary rounding-up elements discharge partially rounded-up dough lumps in a tangential direction, means to support the preliminary rounding-up elements in close proximity to the receiving end of said main rounding-up element and driving means for rotating the rotatory rounding-up elements.

15. In a rounder, preliminary rounding-up elements comprising a rounding-up bowl and a roll coacting therewith, one of which is of conelike form and forming with the other a trough, and one of which elements is stationary and one rotatable, in combination with main stationary and rotatory rounding-up elements, of which the stationary element has a receiving end, upon which the preliminary rounding-up elements discharge partially rounded-up dough lumps in a tangential direction, means to support the preliminary rounding-up elements in close proximity to the receiving end of the main rounding-up elements and driving means for rotating the rotatory rounding-up elements.

16. In a rounder, a preliminary rounding-up bowl containing a discharge opening in its side wall, a rounding-up roll in said bowl, one of said elements being stationary and one rotatable, and the two forming between them a trough in which dough lumps are partially rounded up, in combination with main stationary and rotatory rounding-up elements, of which the stationary element has a receiving end disposed in close proximity to said discharge opening and upon which the preliminary rounding-up elements discharge partially rounded-up dough lumps, and driving means for rotating the rotatory rounding-up elements.

17. In a rounder, coacting stationary and rotatory preliminary rounding-up means, main rounding-up means, including a stationary, spiral rounding-up member and a cooperating, rotatory, rounding-up bowl, means to support the preliminary rounding-up means in said bowl, said preliminary rounding-up means discharging partially rounded-up dough lumps upon the main rounding-up means, and drive mechanism for the rotating members of the preliminary and main rounding-up means.

18. In a rounder, the combination with a main rounding-up bowl of inverted frusto-conical form and a stationary, spiral rounding-up member having a lip contacting with the internal face of said bowl with its lower end located at a point spaced above the bottom of the bowl, said spiral member being of less than 360° in extent, whereby dough slivers escaping between the bowl and spiral rounding-up member cannot fall upon any lower part of the spiral rounding-up member.

19. In a rounder, preliminary rounding-up means comprising cooperating stationary and rotatory rounding-up elements upon which dough lumps are delivered and between which they are partially rounded up and from which they are discharged in a tangential direction, in combination with main rounding-up means comprising cooperating, stationary and rotatory rounding-up elements, the latter element being hollow and containing the preliminary rounding-up means, and the stationary element having a receiving end located below the preliminary rounding-up means and upon which the latter discharges the partially rounded-up dough lumps in a tangential direction thereto, and driving means for rotating the rotating elements of both rounding-up means.

20. In a rounder, the combination of a spiral rounding-up member, a strip of woven material secured thereto and extending along its working face, and a plastic smoothening substance enveloping said woven material and anchored to it, said woven material serving as a binder for holding said smoothening substance in place against the working face of the spiral rounding-up member.

21. In a rounder, the combination of a spiral rounding-up member, a strip of wire mesh secured thereto and extending along its working face, and a paraffin body enveloping said wire mesh and anchored to it, said wire mesh serving as a binder for holding said paraffin in place against the working face of the spiral rounding-up member.

22. In a rounder, a stationary spiral rounding-up member, a strip of wire mesh secured thereto and extending along its working face and a body of paraffin enveloping said wire mesh and anchored to it, said wire mesh serving as a binder for holding said paraffin body in place against the working face of the spiral rounding-up member, in combination with a rotatory rounding-up member cooperating with said stationary spiral rounding-up member to form a trough in which dough lumps are propelled by the rotatory rounding-up member along the paraffin covered face of the spiral rounding-up member.

FRED MARASSO.